(12) United States Patent
Takakura et al.

(10) Patent No.: US 10,422,809 B2
(45) Date of Patent: Sep. 24, 2019

(54) ELECTRONIC APPARATUS AND PROGRAM

(71) Applicants: SEIKO INSTRUMENTS INC., Chiba-shi, Chiba (JP); ASICS Corporation, Kobe-shi, Hyogo (JP)

(72) Inventors: Akira Takakura, Chiba (JP); Hiroshi Shimizu, Chiba (JP); Tomohiro Ihashi, Chiba (JP); Keisuke Tsubata, Chiba (JP); Takehiro Tagawa, Kobe (JP); Ryota Shinayama, Kobe (JP)

(73) Assignees: SEIKO INSTRUMENTS INC. (JP); ASICS CORPORATION (JP)

( * ) Notice: Subject to any disclaimer, the term of this patent is extended or adjusted under 35 U.S.C. 154(b) by 578 days.

(21) Appl. No.: 14/424,958

(22) PCT Filed: Aug. 8, 2013

(86) PCT No.: PCT/JP2013/071510
§ 371 (c)(1),
(2) Date: Feb. 27, 2015

(87) PCT Pub. No.: WO2014/034403
PCT Pub. Date: Mar. 6, 2014

(65) Prior Publication Data
US 2015/0241459 A1      Aug. 27, 2015

(30) Foreign Application Priority Data

Sep. 3, 2012   (JP) .................................. 2012-193255
Sep. 3, 2012   (JP) .................................. 2012-193256

(51) Int. Cl.
*G01P 3/00*       (2006.01)
*G01C 22/00*      (2006.01)
(Continued)

(52) U.S. Cl.
CPC ................ *G01P 3/00* (2013.01); *G01B 21/22* (2013.01); *G01C 22/006* (2013.01); *G01P 3/50* (2013.01); *G01P 3/64* (2013.01); *G01P 21/02* (2013.01)

(58) Field of Classification Search
CPC ................................. G01C 22/006; G01P 3/00
See application file for complete search history.

(56) References Cited

U.S. PATENT DOCUMENTS

| 8,082,122 B2 | 12/2011 | No ................................ 702/160 |
| 2009/0043531 A1 | 2/2009 | Kahn et al. ................... 702/149 |

(Continued)

FOREIGN PATENT DOCUMENTS

| EP | 1903311 | 3/2008 |
| JP | 0259419 | 5/1990 |

(Continued)

OTHER PUBLICATIONS

European Search Report dated Mar. 7, 2016 in Application No. EP 13 83 2269.

(Continued)

*Primary Examiner* — Yu-Hsi D Sun
(74) *Attorney, Agent, or Firm* — Adams & Wilks

(57) ABSTRACT

A wristwatch includes a storing unit that stores relational data for predetermined user classifications, such as gender and body height, indicating a relationship between a traveling pitch, which is the number of steps taken by a user per predetermined amount of time, and a traveling speed which is a running speed or a walking speed. A correcting unit corrects the stored relational data based on a set of a measured traveling pitch and a measured traveling speed. A speed calculating unit calculates a traveling speed of the user from a measured traveling pitch of the user based on the (Continued)

| STATUS | SET STATUS OF GENDER | PACE CALCULATION IN CHRONOGRAPH MODE (PRIMARY EXPRESSION FOR CALCULATING TRAVELING PITCH-TRAVELING SPEED) |
|---|---|---|
| FACTORY SETTING (INITIAL STATUS) | MALE | TRAVELING SPEED (m/min) V $=a_1 \times$ TRAVELING PITCH P$-b_1$ |
| | FEMALE | TRAVELING SPEED (m/min) V $=a_2 \times$ TRAVELING PITCH P$-b_2$ |
| AFTER DATA SETTING OF USER | MALE | TRAVELING SPEED (m/min) V $=a_1 \times$ TRAVELING PITCH P$-$(USER COEFFICIENT $b_{s1}$) |
| | FEMALE | TRAVELING SPEED (m/min) V $=a_2 \times$ TRAVELING PITCH P$-$(USER COEFFICIENT $b_{s2}$) | stored relational data that correspond to a user classification input by the user and that has been corrected.

11 Claims, 9 Drawing Sheets

(51) Int. Cl.
    *G01P 3/64*     (2006.01)
    *G01P 3/50*     (2006.01)
    *G01B 21/22*     (2006.01)
    *G01P 21/02*     (2006.01)

(56) References Cited

U.S. PATENT DOCUMENTS

| | | | |
|---|---|---|---|
| 2010/0010774 A1 | 1/2010 | Ma et al. | 702/160 |
| 2012/0084053 A1 | 4/2012 | Yuen et al. | 702/160 |
| 2013/0261962 A1* | 10/2013 | Takaoka | G01C 21/16 |
| | | | 701/472 |

FOREIGN PATENT DOCUMENTS

| | | |
|---|---|---|
| JP | 06273546 | 9/1994 |
| JP | 7333000 | 12/1995 |
| JP | 2001173571 | 6/2001 |
| JP | 2005049202 | 2/2005 |
| JP | 2006118909 | 5/2006 |
| JP | 2007093939 | 4/2007 |
| JP | 2008292294 | 12/2008 |
| JP | 2008292295 | 12/2008 |
| JP | 2009276282 | 11/2009 |
| JP | 2010017525 | 1/2010 |
| JP | 2010085285 | 4/2010 |

OTHER PUBLICATIONS

Jeremy D Wendt et al: "GUD WIP: Gait-Understanding-Driven Walking-In-Place", Virtual Reality Conference (VR), 2010 IEEE, IEEE, Piscataway, NJ, USA, Mar. 20, 2010 (Mar. 20, 2010), pp. 51-58.

Hirokawa et al: "Normal gait characteristics under temporal and distance constraints", Journal of Biomedical Engineering, Butterworth, Guildford, GB, vol. 11, No. 6, Nov. 1, 1989 (Nov. 1, 1989), pp. 449-456.

European Search Report dated Mar. 7, 2016 in Application No. EP 13 83 2060.

Notice of Reasons for Rejection together with English language translation thereof, dated May 23, 2017 by the Japanese Patent Office in Japanese Application No. 2014-532908.

U.S. Office Action dated May 4, 2018 in U.S. Appl. No. 14/424,951.

Decision of Rejection dated Dec. 5, 2017 in Japanese Patent Application No. 2014-532907 together with English-language translation thereof.

Decision of Rejection dated Dec. 5, 2017 in Japanese Patent Application No. 2014-532908 together with English-language translation thereof.

International Search Report dated Nov. 12, 2013 issued in International Appln. No. PCT/JP2013/071515 together with English translation thereof.

International Search Report dated Nov. 12, 2013 issued in International Appln. No. PCT/JP2013/071510 together with English translation thereof.

* cited by examiner

FIG. 3

| STATUS | SET STATUS OF GENDER | PACE CALCULATION IN CHRONOGRAPH MODE (PRIMARY EXPRESSION FOR CALCULATING TRAVELING PITCH-TRAVELING SPEED) |
|---|---|---|
| FACTORY SETTING (INITIAL STATUS) | MALE | TRAVELING SPEED (m/min) V $= a_1 \times$ TRAVELING PITCH P$-b_1$ |
| | FEMALE | TRAVELING SPEED (m/min) V $= a_2 \times$ TRAVELING PITCH P$-b_2$ |
| AFTER DATA SETTING OF USER | MALE | TRAVELING SPEED (m/min) V $= a_1 \times$ TRAVELING PITCH P$-$(USER COEFFICIENT $b_{s1}$) |
| | FEMALE | TRAVELING SPEED (m/min) V $= a_2 \times$ TRAVELING PITCH P$-$(USER COEFFICIENT $b_{s2}$) |

FIG. 4

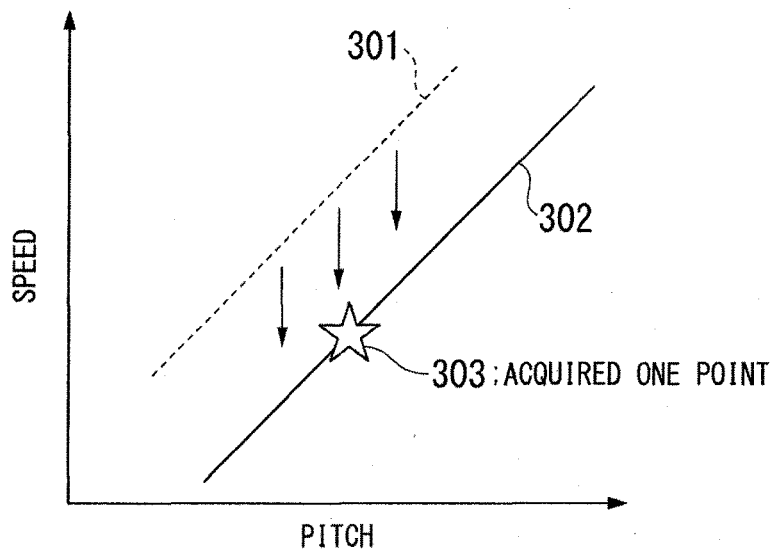

FIG. 7

| STATUS OF SET UP MODE | SET STATUS OF GENDER | PACE CALCULATION IN CHRONOGRAPH MODE (PRIMARY EXPRESSION FOR CALCULATING PITCH – SPEED) |
|---|---|---|
| FACTORY SETTING (INITIAL STATUS) | MALE | TRAVELING SPEED (m/min) V $= a_1 \times$ TRAVELING PITCH P $- b_1$ |
| | FEMALE | TRAVELING SPEED (m/min) V $= a_2 \times$ TRAVELING PITCH P $- b_2$ |
| AFTER DATA SETTING OF USER | MALE | TRAVELING SPEED (m/min) V $=$ (USER COEFFICIENT $a_s$) $\times$ TRAVELING PITCH P $-$ (USER COEFFICIENT $b_s$) |
| | FEMALE | |

FIG. 8

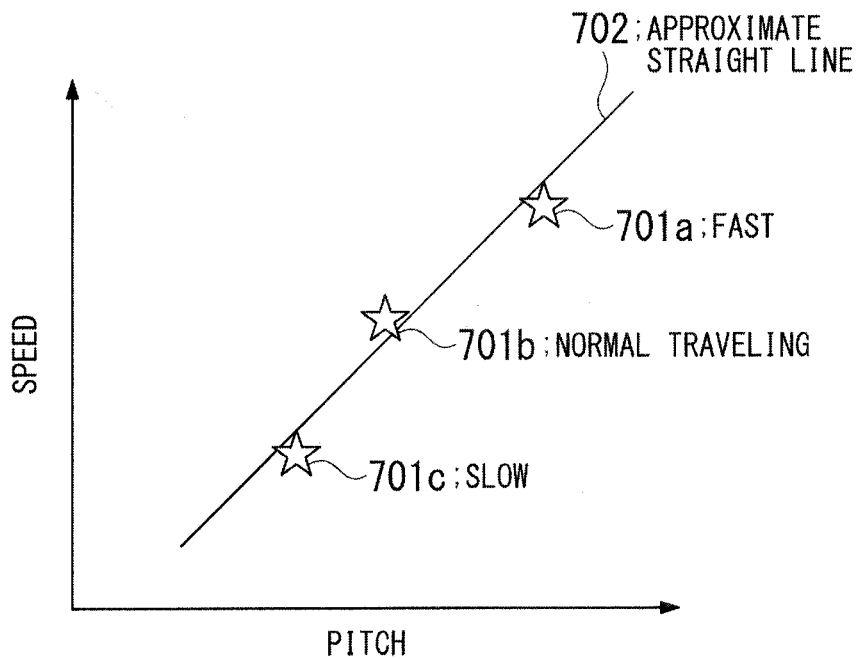

FIG. 10

| STATUS | SET STATUS OF GENDER | PACE CALCULATION IN CHRONOGRAPH MODE (PRIMARY EXPRESSION FOR CALCULATING TRAVELING PITCH-TRAVELING SPEED) |
|---|---|---|
| FACTORY SETTING (INITIAL STATUS) | MALE | TRAVELING SPEED (m/min) V $= c_1 \times$ BODY HEIGHT X $\times$ TRAVELING PITCH P$-d_1$ |
| | FEMALE | TRAVELING SPEED (m/min) V $= c_2 \times$ BODY HEIGHT X $\times$ TRAVELING PITCH P$-d_2$ |
| AFTER DATA SETTING OF USER | MALE | TRAVELING SPEED (m/min) V $= c_1 \times$ BODY HEIGHT X $\times$ TRAVELING PITCH P$-$(USER COEFFICIENT $d_{s1}$) |
| | FEMALE | TRAVELING SPEED (m/min) V $= c_2 \times$ BODY HEIGHT X $\times$ TRAVELING PITCH P$-$(USER COEFFICIENT $d_{s2}$) |

ELECTRONIC APPARATUS AND PROGRAM

FIELD OF THE INVENTION

The present invention relates to an electronic apparatus and a program.

Priority is claimed on Japanese Patent Application No. 2012-193255, filed Sep. 3, 2012 and Japanese Patent Application No. 2012-193256, filed Sep. 3, 2012, the content of which is incorporated herein by reference.

RELATED ART

In the related art, a mobile electronic apparatus to which an acceleration sensor and the like are mounted to calculate a running speed or a walking speed of a user is known (for example, refer to Patent Document 1). Such an apparatus includes timekeeping means and step number measuring means, in which an average speed of the use is calculated based on a set step length, a kept time, and the number of steps, and the calculated average speed is notified to the user.

REFERENCE DOCUMENT

Patent Document

[Patent Document 1] Japanese Unexamined Utility Model Application, First Publication No. H2-59419

DISCLOSURE OF THE INVENTION

Problems to be Solved by the Invention

However, in the technique described in Patent Document 1, it is necessary to input a unique step length value of the user in advance. When the user does not know his/her own step length value, the user cannot input the step length value. Therefore, an operation of detecting the step length value of the user using a method is required. In addition, the step length value may vary depending on the traveling status (whether the user walks or runs, and the speed thereof), and thus an error is likely to occur in the speed calculated based on only step length data.

Therefore, the present invention has been made in consideration of the above-described circumstances, and more accurately, has been made to provide an electronic apparatus capable of calculating a traveling speed of the user with high accuracy, and a program therefor.

Methods for Solving the Problem

According to some aspects of the present invention, there is provided an electronic apparatus including: a storing unit that stores relational data indicating a relationship between a traveling pitch, which is the number of steps taken per predetermined amount of time, and a traveling speed which is a running speed or a walking speed; and a speed calculating unit that calculates a traveling speed of a user from a measured traveling pitch of the user based on the relational data stored in the storing unit.

In addition, according to another aspect of the present invention, the electronic apparatus further includes: an acquiring unit that acquires a set of a measured traveling pitch and a traveling speed measured during measurement of the traveling pitch; and a correcting unit that corrects the relational data, which is stored in the storing unit, based on the set of the traveling pitch and the traveling speed acquired by the acquiring unit.

In addition, according to another aspect of the present invention, the electronic apparatus further includes an input unit that receives an input of a body height or information relating to the body height, in which the storing unit stores the relational data indicating a relationship between a body height or information relating to the body height, a traveling pitch which is the number of steps taken per predetermined amount of time, and a traveling speed which is a running speed or a walking speed, and the speed calculating unit calculates the traveling speed of the user from the body height or the information relating to the body height, whose input is received by the input unit, and the measured traveling pitch of the user based on the relational data stored in the storing unit.

In addition, according to another aspect of the present invention, the electronic apparatus further includes: an acquiring unit that acquires a plurality of sets of a measured traveling pitch and a traveling speed measured during measurement of the traveling pitch; and a generating unit that generates the relational data indicating the relationship between the traveling pitch and the traveling speed based on the plurality of sets of the traveling pitch and the traveling speed acquired by the acquiring unit.

In addition, according to another aspect of the present invention, in the electronic apparatus, the acquiring unit receives an input of a set of a traveling pitch and a running quickness or a walking quickness.

In addition, according to another aspect of the present invention, the electronic apparatus further includes a traveling distance calculating unit that calculates a traveling distance, which is a running distance or a walking distance of the user, based on the traveling speed calculated by the speed calculating unit.

In addition, according to another aspect of the present invention, the electronic apparatus further includes a pace calculating unit that calculates a traveling pace, which is a walking pace or a running pace of the user, based on the traveling speed calculated by the speed calculating unit.

In addition, according to another aspect of the present invention, in the electronic apparatus, the storing unit stores table data indicating a relationship between the traveling pitch and the traveling speed.

In addition, according to another aspect of the present invention, in the electronic apparatus, the speed calculating unit calculates a traveling pace, which is a running pace or a walking pace of the user, instead of the traveling speed of the user.

In addition, according to another aspect of the present invention, the electronic apparatus further includes: an acceleration sensor that detects an acceleration; and a traveling detection unit that measures the traveling pitch of the user based on an acceleration which is generated by a body movement relating to running or walking.

In addition, according to another aspect of the present invention, there is provided an electronic apparatus including: a storing unit that stores relational data indicating a relationship between a traveling pitch, which is the number of steps taken per predetermined amount of time, and a traveling speed which is a running speed or a walking speed; an acquiring unit that acquires a set of a measured traveling pitch and a traveling speed measured during measurement of the traveling pitch; and a correcting unit that corrects the relational data, which is stored in the storing unit, based on the set of the traveling pitch and the traveling speed acquired by the acquiring unit.

In addition, according to another aspect of the present invention, there is provided an electronic apparatus including: an acquiring unit that acquires a plurality of sets of a measured traveling pitch and a traveling speed measured during measurement of the traveling pitch; and a generating unit that generates relational data indicating a relationship between a traveling pitch, which is the number of steps taken per predeteimined amount of time, and a traveling speed, which is a running speed or a walking speed, based on the plurality of sets of the traveling pitch and the traveling speed acquired by the acquiring unit.

In addition, according to another aspect of the present invention, there is provided a program causing a computer to execute: a step of calculating a traveling speed of a user from a measured traveling pitch of the user based on relational data indicating a relationship between the traveling pitch, which is the number of steps taken per predetermined amount of time, and the traveling speed which is a running speed or a walking speed.

In addition, according to another aspect of the present invention, there is provided a program causing a computer to execute the following steps including: a step of acquiring a set of a measured traveling pitch and a traveling speed measured during measurement of the traveling pitch; and a step of correcting relational data indicating a relationship between a traveling pitch, which is the number of steps taken per predetermined amount of time, and a traveling speed, which is a running speed or a walking speed, based on the acquired set of the traveling pitch and the traveling speed.

In addition, according to another aspect of the present invention, there is provided a program causing a computer to execute the following steps including: a step of calculating a traveling speed of a user from an input body height or input information relating to the body height and a measured traveling pitch of the user, based on relational data indicating a relationship between the body height or the information relating to the body height, the traveling pitch which is the number of steps taken per predetermined amount of time, and the traveling speed which is a running speed or a walking speed.

In addition, according to another aspect of the present invention, there is provided a program causing a computer to execute the following steps including: a step of acquiring a plurality of sets of a measured traveling pitch and a traveling speed measured during measurement of the traveling pitch; and a step of generating relational data indicating a relationship between a traveling pitch, which is the number of steps taken per predetermined amount of time, and a traveling speed, which is a running speed or a walking speed, based on the acquired plurality of sets of the traveling pitch and the traveling speed.

Effects of the Invention

According to some aspects of the present invention, the relational data indicating a relationship between the traveling pitch and the traveling speed is stored in advance, and the traveling speed of the user is calculated from the measured traveling pitch of the user based on the relational data. As a result, a change in step length caused by a variation in traveling pitch is absorbed, and the traveling speed can be calculated with higher accuracy.

BRIEF DESCRIPTION OF THE DRAWINGS

FIG. 3 is a diagram illustrating an example of relational data indicating the relationship between the traveling pitch and the traveling speed which is stored in a storing unit according to the first embodiment of the present invention.

FIG. 4 is a diagram illustrating a method of correcting a relational expression according to the first embodiment of the present invention.

FIG. 7 is a diagram illustrating an example of relational data indicating the relationship between the traveling pitch and the traveling speed which is stored in a storing unit according to a second embodiment of the present invention.

FIG. 8 is a diagram illustrating a method of generating a relational expression according to the second embodiment of the present invention.

FIG. 10 is a diagram illustrating an example of relational data indicating a relationship between the traveling pitch, a body height, and the traveling speed which is stored in a storing unit according to a third embodiment of the present invention.

EMBODIMENTS OF THE INVENTION

First Embodiment

Figure 1:
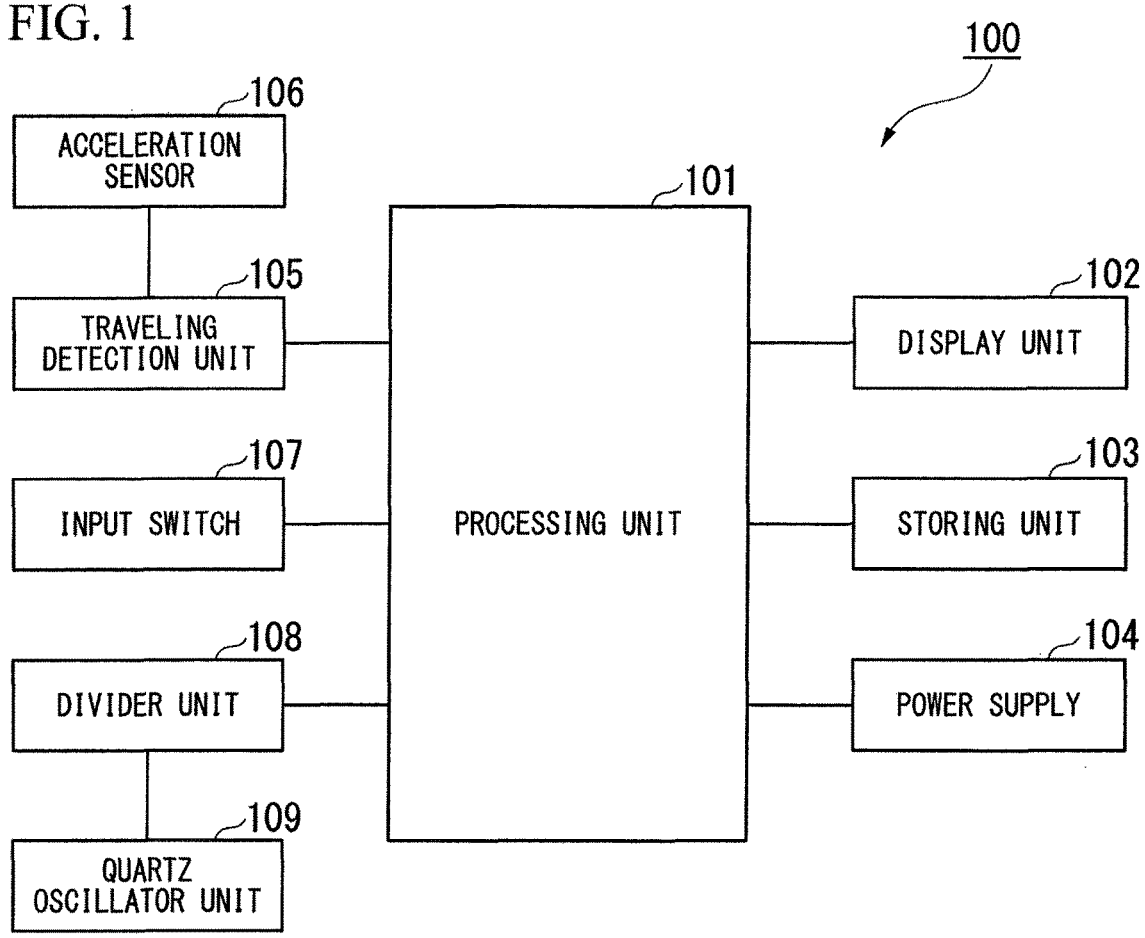
FIG. 1 is a block diagram illustrating a configuration of a wristwatch according to a first embodiment of the present invention.

Hereinafter, a first embodiment of the present invention will be described with reference to the drawings. In the embodiment, an example of a wristwatch will be described as an example of an electronic apparatus. FIG. 1 is a block diagram illustrating a configuration of a wristwatch 100 according to the embodiment. The wristwatch 100 is an electronic watch that measures a traveling pitch of the user, calculates a traveling speed of the user from the measured traveling pitch, and displays the calculated traveling speed. The traveling pitch is the number of steps taken per predetermined amount of time (for example, 1 minute). The traveling speed is a running speed or a walking speed. The wristwatch 100 includes two operation modes including: a measurement (chronograph) mode for measuring the traveling pitch; and a setup mode for changing the setting of the wristwatch 100. In the example illustrated in the drawing, the wristwatch 100 includes a processing unit 101 (speed calculating unit, acquiring unit, correcting unit, traveling distance calculating unit, pace calculating unit), a display unit 102, a storing unit 103, a power supply 104, a traveling detection unit 105, an acceleration sensor 106, an input switch 107 (acquiring unit, input unit), a divider unit 108, and a quartz oscillator unit 109.

The processing unit 101 is a central processing unit that controls each unit included in the wristwatch 100. For example, the processing unit 101 calculates a traveling speed of the user from a traveling pitch of the user, which is measured by the traveling detection unit 105, based on relational data indicating a relationship between the traveling pitch and the traveling speed which is stored in the storing unit 103. In addition, the processing unit 101 corrects the relational data stored in the storing unit 103 based on a set of an actual traveling pitch and an actual traveling speed measured during measurement of the traveling pitch. In addition, the processing unit 101 calculates a traveling distance of the user based on the calculated traveling speed. The traveling distance is a walking distance or a running distance. In addition, the processing unit 101 calculates a traveling pace based on the calculated traveling speed. The traveling pace is a walking pace or a running pace and is the inverse number of the traveling speed. In addition, the processing unit 101 displays information relating to traveling on the display unit 102. Examples of the information relating to traveling include a traveling time, the number of steps, the traveling pitch, the traveling speed, the traveling distance, and the traveling pace. The traveling time is a walking time or a running time.

Further, the processing unit 101 may realize a speed calculating function, which is a function of the wristwatch 100, by executing a program for calculating the traveling speed. Specifically, the program for calculating the traveling speed may be stored in the storing unit 103 or a memory (not illustrated), and the processing unit 101 may realize the speed calculating function by reading and executing the program. In this case, it can be considered that the wristwatch 100 includes the speed calculating unit that calculates the speed.

Further, the processing unit 101 may realize an acquiring function, which is a function of the wristwatch 100, by executing a program for acquiring the set of the traveling pitch and the traveling speed. Specifically, the program for acquiring the set of the traveling pitch and the traveling speed may be stored in the storing unit 103 or a memory (not illustrated), and the processing unit 101 may realize the acquiring function by reading and executing the program. In this case, it can be considered that the wristwatch 100 includes the acquiring unit that acquires the set of the traveling pitch and the traveling speed.

Further, the processing unit 101 may realize an correcting function, which is a function of the wristwatch 100, by executing a program for correcting the relational data stored in the storing unit 103. Specifically, the program for correcting the relational data stored in the storing unit 103 may be stored in the storing unit 103 or a memory (not illustrated), and the processing unit 101 may realize the correcting function by reading and executing the program. In this case, it can be considered that the wristwatch 100 includes the correcting unit that corrects the relational data stored in the storing unit 103.

Further, the processing unit 101 may realize a traveling distance calculating function, which is a function of the wristwatch 100, by executing a program for calculating the traveling distance based on the traveling speed. Specifically, the program for calculating the traveling distance based on the traveling speed may be stored in the storing unit 103 or a memory (not illustrated), and the processing unit 101 may realize the traveling distance calculating function by reading and executing the program. In this case, it can be considered that the wristwatch 100 includes the traveling distance calculating unit that calculates the traveling distance based on the traveling speed.

Further, the processing unit 101 may realize a pace calculating function, which is a function of the wristwatch 100, by executing a program for calculating the running pace or the walking pace based on the traveling speed. Specifically, the program for calculating the running pace or the walking pace based on the traveling speed may be stored in the storing unit 103 or a memory (not illustrated), and the processing unit 101 may realize the pace calculating function by reading and executing the program. In this case, it can be considered that the wristwatch 100 includes the pace calculating unit that calculates the running pace or the walking pace based on the traveling speed.

The display unit 102 is, for example, a liquid crystal display and displays the clock time, information relating to the traveling, and the like. The storing unit 103 is configured of a ROM (Read Only Memory) 105 or a RAM (Random Access Memory) 106 and stores relational data indicating a relationship between the traveling pitch and the traveling speed. The power supply 104 supplies electrical power to each unit included in the wristwatch 100.

The acceleration sensor 106 detects an acceleration. The traveling detection unit 105 measures the traveling pitch of the user based on the acceleration detected by the acceleration sensor 106. For example, the traveling detection unit 105 measures the traveling pitch of the user based on the acceleration (for example, information relating to landing) which is generated by a body movement of running or walking. Specifically, from the acceleration detected by the acceleration sensor 106, the traveling detection unit 105 detects a vibration of the body during walking or running to measure the number of steps. In addition, the traveling detection unit 105 measures the traveling pitch based on the measured traveling time and the measured number of steps.

The input switch 107 is configured of a switch capable of being manipulated from the outside and is the input unit that receives an input. For example, the input switch 107 receives an input of a set of an actual traveling pitch and an actual traveling quickness of the user. The traveling quickness refers to a walking quickness or a running quickness, for example, a traveling speed or a traveling pace. In addition, the input switch 107 receives an input of a gender of the user. The quartz oscillator unit 109 outputs a signal having a predetermined frequency. The divider unit 108 divides the frequency of the output signal of the quartz oscillator unit 109 at a predetermined division ratio and outputs a reference clock signal for the processing unit 101 or a clock signal for timekeeping. The processing unit 101, the divider unit 108, and the quartz oscillator unit 109 are the timekeeping units for measuring the time. The timekeeping unit realizes a stopwatch function for measuring the traveling time of the user or a clock function for displaying the present clock time.

Figure 2:
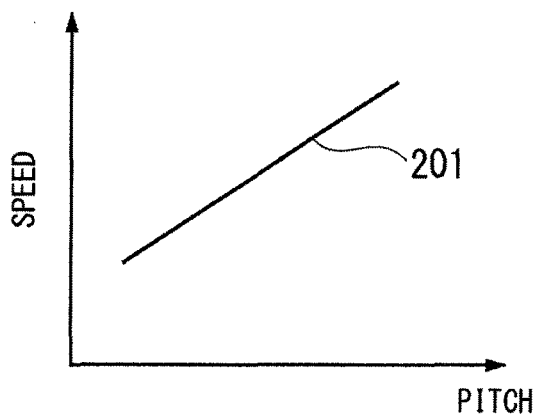
FIG. 2 is a diagram illustrating plot data indicating a relationship between a traveling pitch and a traveling speed according to the first embodiment of the present invention.

FIG. 2 is a diagram illustrating plot data indicating a relationship between the traveling pitch and the traveling speed. From the plot data 201 between the traveling pitch and the traveling speed illustrated in this drawing, it can be seen that there is a correlation between the traveling pitch and the traveling speed. For example, in general, when a person walks or runs, there are the following tendencies: the traveling pitch increases during a fast running (or walking)

movement; and the traveling pitch decreases during a slow running (or walking) movement. Therefore, by preparing a predetermined relational expression, the traveling speed can be obtained from the traveling pitch. Accordingly, the storing unit 103 according to the embodiment stores relational data indicating a relationship between the traveling pitch and the traveling speed in advance.

Next, the relational data indicating the relationship between the traveling pitch and the traveling speed, which is stored in the storing unit 103, will be described. FIG. 3 is a diagram illustrating an example of relational data indicating the relationship between the traveling pitch and the traveling speed which is stored in the storing unit 103 according to the embodiment. As illustrated in the drawing, the storing unit 103 stores expressions (hereinafter, referred to as "relational expression") corresponding to male and female to calculate the traveling speed from the traveling pitch. The relational expression refers to the primary expression "Traveling Speed V=(Gradient)×Traveling Pitch P−(Offset)". In the drawing, the relational expressions corresponding to the status "FACTORY SETTING (INITIAL STATUS)" are initial relational expressions which are stored in the storing unit 103 at the time of factory shipment. In an initial relational expression corresponding to male, a gradient is $a_1$, and an offset is $b_1$. In an initial relational expression corresponding to female, a gradient is $a_2$, and an offset is $b_2$.

In addition, a relational expression corresponding to the status "AFTER DATA SETTING OF USER" is a relational expression after correction. The processing unit 101 corrects the initial relational expression based on the set of the actual traveling pitch and the actual traveling speed of the user. FIG. 4 is a diagram illustrating a method of correcting a relational expression according to the embodiment. In a graph of this drawing, the horizontal axis represents the traveling pitch, and the vertical axis represents the traveling speed. In this drawing, a dotted line 301 represents the initial relational expression. In addition, in the drawing, a solid line 302 represents the relational expression after correction. The processing unit 101 changes the offset of the initial relational expression 301 so as to pass through the set (actual traveling pitch, actual traveling speed) 303 of the actual traveling pitch and the actual traveling speed. At this time, the processing unit 101 does not change the gradient of the initial relational expression 301. For example, in an example illustrated in FIG. 3, the processing unit 101 corrects the relational expression by changing the offset of the initial relational expression corresponding to male from $b_1$ to a user coefficient $b_{s1}$. In addition, the processing unit 101 corrects the relational expression by changing the offset of the initial relational expression corresponding to female from $b_2$ to a user coefficient $b_{s2}$. The relational expression after correction stored in the storing unit 103 can be changed by a manual input from the input switch 107.

The set of the actual traveling pitch and the actual traveling speed of the user can be measured by the user actually traveling a predetermined distance d. The predetermined distance d is set in the wristwatch 100 in advance. The value of the predetermined distance d set in the wristwatch 100 can be changed by the user through the input switch 107 or the like. For example, the user may input a running distance or a walking distance after running or walking. The processing unit 101 measures the traveling time where the user travels the predetermined distance d. The processing unit 101 calculates the actual traveling speed by dividing the predetermined distance d by the traveling time. In addition, the traveling detection unit 105 calculates the actual traveling pitch by measuring the number of steps when the user travels the predetermined distance d, and dividing the measured number of steps by the traveling time.

Alternatively, the user may measure the actual traveling pitch and the actual traveling quickness using a method and then may input the actual traveling pitch and the actual traveling quickness through the input switch 107 and data transmission. As a result, when the relational expression is corrected or generated, it is not necessary that the user actually travel.

Alternatively, the set of the actual traveling pitch and the actual traveling speed of the user may be acquired from another electronic apparatus using communication means (not illustrated).

Figure 5:
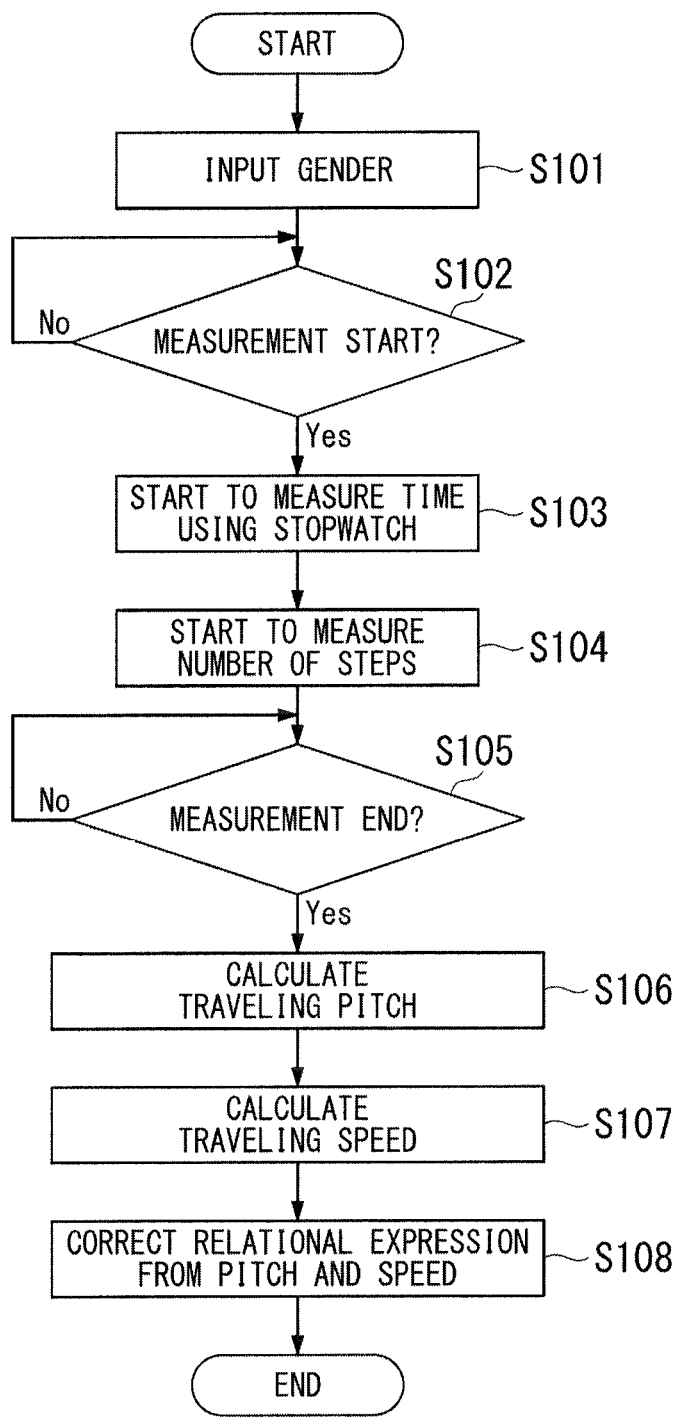
FIG. 5 is a flowchart illustrating the procedure of a relational expression correcting process which is executed by a wristwatch according to the first embodiment of the present invention.

Next, a relational expression correcting process in which the wristwatch 100 according to the embodiment corrects the relational expression will be described. FIG. 5 is a flowchart illustrating the procedure of the relational expression correcting process which is executed by the wristwatch 100 according to the embodiment. The wristwatch 100 executes the relational expression correcting process during the setup mode. During the setup mode, the user inputs an instruction to start the measurement and starts traveling. Next, once the user travels the predetermined distance d, the user inputs an instruction to end the measurement.

(Step S101) The processing unit 101 displays the gender (male or female) on the display unit 102 to be selectable and receives an input of the selection of the gender. The user selects the gender through the input switch 107. Next, the process proceeds to Step S102.

(Step S102) The processing unit 101 determines whether or not an instruction to start the measurement is input from the input switch 107. When the instruction to start the measurement is input, the process proceeds to Step S103. When the instruction to start the measurement is not input, the process returns to Step S102.

(Step S103) The processing unit 101 starts to measure the traveling time using the stopwatch function. Next, the process proceeds to Step S104.

(Step S104) The processing unit 101 starts to measure the number of steps using the traveling detection unit 105. Next, the process proceeds to Step S105.

(Step S105) The processing unit 101 determines whether or not an instruction to end the measurement is input from the input switch 107. When the instruction to end the measurement is input, the processing unit 101 ends the timekeeping of the stopwatch and the measurement of the number of steps. The process proceeds to Step S106. The user walks or runs the predetermined distance d during a period from the input of the instruction to start the measurement to the input of the instruction to end the measurement. On the other hand, when the instruction to end the measurement is not input, the processing unit 101 returns to Step S105.

(Step S106) The traveling detection unit 105 calculates the traveling pitch by dividing the measured number of steps by the measured traveling time. Next, the process proceeds to Step S107.

(Step S107) The processing unit 101 calculates the traveling speed by dividing the predetermined distance d by the measured traveling time. Next, the process proceeds to Step S108.

(Step S108) The processing unit 101 corrects the relational expression using the set of the traveling pitch calculated in Step S106 and the traveling speed calculated in Step S107. Specifically, first, the processing unit 101 reads the initial relational expression corresponding to the gender input in Step S101 from the storing unit 103. The processing unit 101 changes the offset of the read relational expression and corrects the relational expression so as to pass through the set of the calculated traveling pitch and the calculated traveling speed. The processing unit 101 writes the corrected relational expression into the storing unit 103 as the relational expression after correction. Next, the relational expression correcting process ends.

Figure 6:
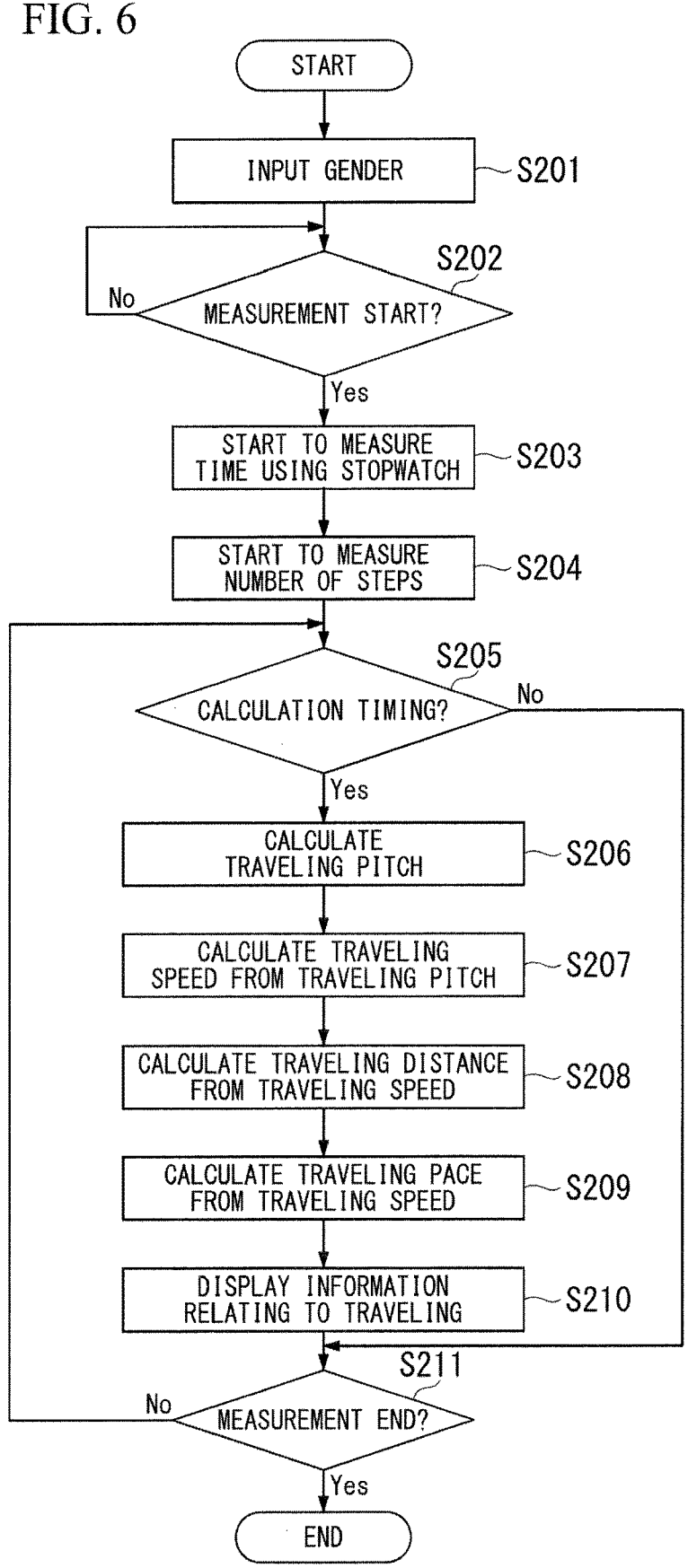
FIG. 6 is a flowchart illustrating the procedure of a speed calculating process which is executed by the wristwatch according to the first embodiment of the present invention.

Next, a speed calculating process in which the wristwatch 100 according to the embodiment calculates the traveling speed from the traveling pitch will be described. FIG. 6 is a flowchart illustrating the procedure of a speed calculating process which is executed by the wristwatch 100 according to the embodiment. The wristwatch 100 executes the speed calculating process during the measurement mode.

(Step S201) The processing unit 101 displays the gender (male or female) on the display unit 102 to be selectable and receives an input of the selection of the gender. The user selects the gender through the input switch 107. Next, the process proceeds to Step S202.

(Step S202) The processing unit 101 determines whether or not an instruction to start the measurement is input from the input switch 107. When the instruction to start the measurement is input, the process proceeds to Step S203. When the instruction to start the measurement is not input, the process returns to Step S202.

(Step S203) The processing unit 101 starts to measure the traveling time using the stopwatch function. Next, the process proceeds to Step S204.

(Step S204) The processing unit 101 starts to measure the number of steps using the traveling detection unit 105. Next, the process proceeds to Step S205.

(Step S205) The processing unit 101 determines whether or not a calculation timing is reached. The calculation timing is the preset timing at which information relating to running is calculated, and is, for example, per second. When the calculation timing is reached, the processing unit 101 proceeds to Step S206. On the other hand, when the calculation timing is not reached, the processing unit 101 proceeds to Step S211.

(Step S206) The traveling detection unit 105 calculates the traveling pitch by dividing the measured number of steps by the measured traveling time. Next, the process proceeds to Step S207.

(Step S207) The processing unit 101 calculates the traveling speed from the traveling pitch calculated in Step S206. Specifically, the processing unit 101 reads the relational expression after correction from the storing unit 103, and substitutes the calculated traveling pitch into the read relational expression to calculate the traveling speed. When the relational expression after correction is not stored in the storing unit 103, the processing unit 101 calculates the traveling speed from the traveling pitch using the initial relational expression corresponding to the gender input in Step S101. Next, the process proceeds to Step S208.

(Step S208) The processing unit 101 calculates the traveling distance by multiplying the traveling speed calculated in Step S207 by the measured time. Next, the process proceeds to Step S209.

(Step S209) The processing unit 101 calculates the traveling pace by calculating the inverse number of the traveling speed calculated in Step S207. Next, the process proceeds to Step S210.

(Step S210) The processing unit 101 displays information relating to traveling on the display unit 102. The information relating to traveling includes the measured number of steps, the measured traveling time, the traveling pitch, the traveling speed, the traveling distance, and the traveling pace. Next, the process proceeds to Step S211.

(Step S211) The processing unit 101 determines whether or not an instruction to end the measurement is input from the input switch 107. When the instruction to end the measurement is input, the processing unit 101 ends the timekeeping of the stopwatch and the measurement of the number of steps. The speed calculating process ends. On the other hand, when the instruction to end the measurement is not input, the processing unit 101 returns to Step S205.

As described above, in the embodiment, the storing unit 103 stores the relational data indicating the relationship between the traveling pitch and the traveling speed in advance. The processing unit 101 calculates the traveling speed from the traveling pitch, which is measured by the traveling detection unit 105, based on the relational data stored in the storing unit 103. As a result, the traveling speed can be directly calculated from the measured traveling pitch without using a step length which is a fixed value. Therefore, the process highly corresponding to the running status (or walking status) can be performed, and the traveling speed can be calculated with few errors.

In addition, in the embodiment, the processing unit 101 corrects the relational expression, which is stored in the storing unit 103, based on the set of the actual traveling pitch and the actual traveling speed. As a result, a relationship between the traveling pitch and the traveling speed which is suited to the user is set, and the traveling speed is calculated from the traveling pitch based on the set relationship. Therefore, a change in step length caused by a variation in traveling pitch is absorbed, and the traveling speed can be calculated with higher accuracy. As a result, the traveling distance and the traveling pace can also be calculated with higher accuracy.

Second Embodiment

Hereinafter, a second embodiment of the present invention will be described with reference to the drawings. A wristwatch 100 according to this embodiment has the same configuration as that of the wristwatch 100 according to the first embodiment. This embodiment has a difference from the first embodiment, in that the processing unit 101 (generating unit) generates the relational expression from the plural sets of the actual traveling pitch and the actual traveling speed. The processing unit 101 calculates the traveling speed from the traveling pitch, which is measured by the traveling detection unit 105, using the generated relational expression.

Further, the processing unit 101 may realize a generating function, which is a function of the wristwatch 100, by executing a program for generating the relational data indicating the relationship between the traveling pitch and the traveling speed based on plural sets of the traveling pitch and the traveling speed. Specifically, the program for generating the relational data indicating the relationship between the traveling pitch and the traveling speed based on plural sets of the traveling pitch and the traveling speed may be stored in the storing unit 103 or a memory (not illustrated), and the processing unit 101 may realize the generating function by reading and executing the program. In this case, it can be considered that the wristwatch 100 includes a generating unit that generates the relational data indicating the relationship between the traveling pitch and the traveling speed based on the plural sets of the traveling pitch and the traveling speed.

FIG. 7 is a diagram illustrating an example of the relational data indicating the relationship between the traveling pitch and the traveling speed which is stored in the storing unit 103 according to the embodiment. As illustrated in the drawing, the storing unit 103 stores primary expressions for calculating the traveling speed from the traveling pitch. In the embodiment, the initial relational expressions corresponding to the status "FACTORY SETTING (INITIAL STATUS)" are the same as those of the first embodiment. In addition, the relational expressions corresponding to the status "AFTER DATA SETTING OF USER" are the relational expressions which are generated by the processing unit 101 from the plural sets of the actual traveling pitch and the actual traveling speed.

FIG. 8 is a diagram illustrating a method of generating a relational expression according to the embodiment. In a graph of this drawing, the horizontal axis represents the traveling pitch, and the vertical axis represents the traveling speed. In addition, in the drawing, a solid line 702 represents the relational expression after generation. The processing unit 101 obtains an approximate straight line (primary expression) from plural sets (actual traveling pitch, actual traveling speed) 701a to 701c of the actual traveling pitch and the actual traveling speed using a least-square method, and the obtained primary expression is set as the relational expression after generation. A gradient may be obtained from the sets 701a to 701c using a least-square method, and the offset which passes through the set 701b corresponding to normal traveling may be obtained. In an example of the drawing, the processing unit 101 generates the relational expressions based on three sets including: the set 701a of the traveling pitch and the traveling speed corresponding to fast traveling; the set 701b of the traveling pitch and the traveling speed corresponding to normal traveling; and the set 701c of the traveling pitch and the traveling speed corresponding to slow traveling. For example, in the example of FIG. 7, the processing unit 101 generates the primary expression "Traveling Speed V=$a_s$×Traveling Pitch P−$b_s$," in which a gradient is a user coefficient $a_s$ and an offset is a user coefficient $b_s$. A method of acquiring the sets of the actual traveling pitch and the actual traveling speed is the same as in that of the first embodiment. Alternatively, the user may measure the actual traveling pitch and the actual traveling quickness using a method multiple times and then may input the plural actual traveling pitches and the plural actual traveling quicknesses through the input switch 107 and data transmission. The relational expression after generation stored in the storing unit 103 can be changed by a manual input from the input switch 107.

Figure 9:
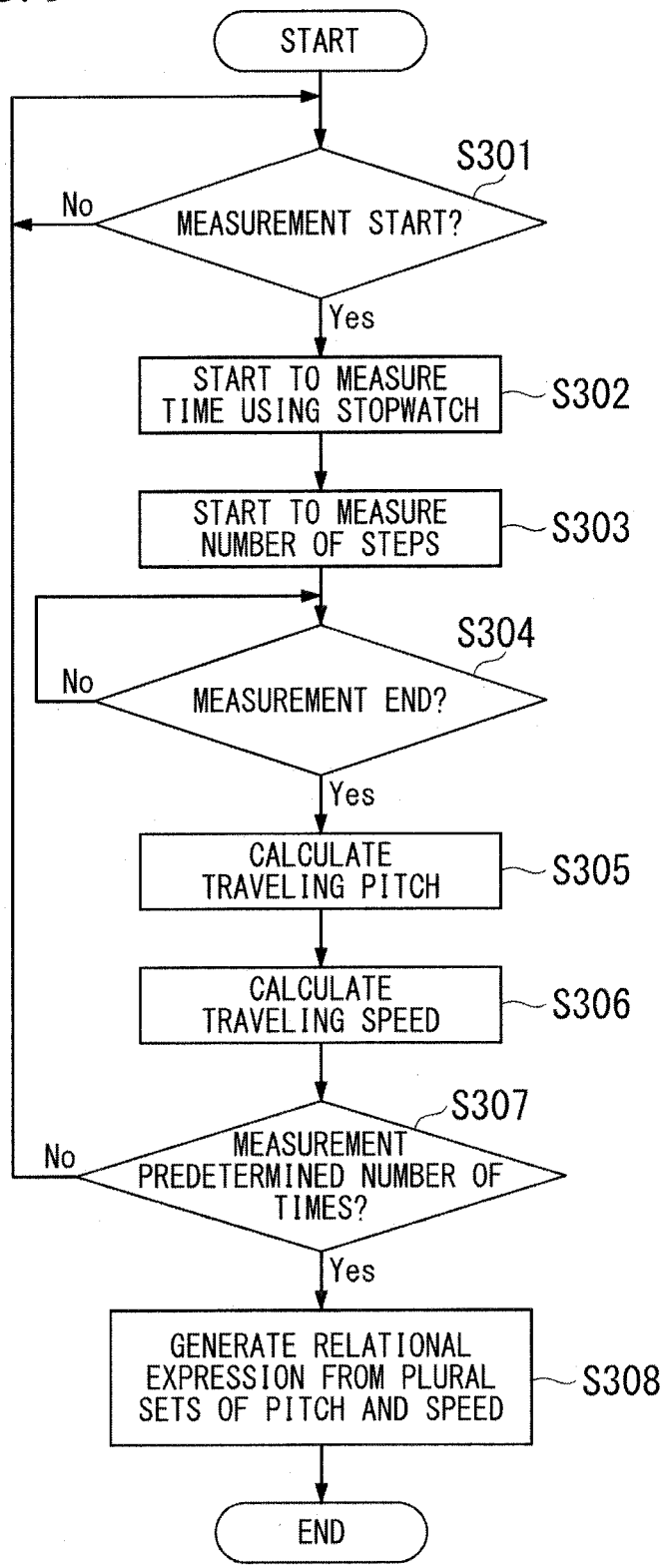
FIG. 9 is a flowchart illustrating the procedure of a relational expression generating process which is executed by a wristwatch according to the second embodiment of the present invention.

Next, a relational expression generating process in which the wristwatch 100 according to the embodiment generates the relational expression will be described. FIG. 9 is a flowchart illustrating the procedure of a relational expression generating process which is executed by the wristwatch 100 according to the embodiment. The wristwatch 100 executes the relational expression generating process during the setup mode. During the setup mode, the user inputs an instruction to start the measurement and starts traveling. Next, once the user travels the predetermined distance d, the user inputs an instruction to end the measurement.

Since the processes of Step S301 to Step S306 are the same as the above-described processes of Step S102 to Step S107, the description thereof will be omitted.

(Step S307) After Step S306, the processing unit 101 determines whether or not the traveling pitch and the traveling speed are measured through the processes of Step S301 to Step S306 a predetermined number of times α (wherein a represents an integer of 2 or more). When the measurement are performed the predetermined number of times α, the process proceeds to Step S308. When the measurement are not performed the predetermined number of times α, the process returns to Step S301.

(Step S308) The processing unit 101 generates the relational expression from the a number of sets of the traveling pitch and the traveling speed which are measured by repeating the processes of Step S301 to Step S306 the predetermined number of times α. Specifically, the processing unit 101 generates the primary expression from the a number of sets of the measured traveling pitch and the measured traveling speed to calculate the traveling speed from the traveling pitch using a least-square method. The processing unit 101 writes the generated primary expression into the storing unit 103 as the relational expression after generation. Next, the relational expression generating process ends.

In the embodiment, the speed calculating process of calculating the traveling speed from the traveling pitch is the same as that of the first embodiment.

As described above, in the embodiment, the processing unit 101 generates the relational expression indicating the relationship between the traveling pitch and the traveling speed based on the plural sets of the actual traveling pitch and the actual traveling speed. As a result, a relationship between the traveling pitch and the traveling speed which is suited to the user is set, and the traveling speed is calculated from the traveling pitch based on the set relationship. Therefore, a change in step length caused by a variation in traveling pitch is absorbed, and the traveling speed can be calculated with higher accuracy. As a result, the traveling distance and the traveling pace can also be calculated with higher accuracy.

Third Embodiment

Hereinafter, a third embodiment of the present invention will be described with reference to the drawings. A wristwatch 100 according to this embodiment has the same configuration as that of the wristwatch 100 according to the first embodiment. This embodiment has a difference from the first embodiment, in that the traveling speed is calculated using a relationship between the traveling pitch, a body height or information relating to the body height, and the traveling speed.

FIG. 10 is a diagram illustrating an example of relational data indicating a relationship between the traveling pitch, a body height, and the traveling speed which is stored in the storing unit 103 according to the embodiment. Information relating to the body height may be used instead of the body height. Examples of the information relating to the body height include an inseam length and a physical constitution (S, M, L).

As illustrated in the drawing, the storing unit 103 stores expressions (hereinafter, referred to as "relational expression") corresponding to male and female to calculate the traveling speed from the traveling pitch and the body height. The relational expression refers to the primary expression "Traveling Speed V=(Gradient)×Body Height X×Traveling Pitch P−(Offset)". In the drawing, the relational expressions corresponding to the status "FACTORY SETTING (INITIAL STATUS)" are initial relational expressions which are stored in the storing unit 103 at the time of factory shipment. In an initial relational expression corresponding to male, a gradient is $a_1$, and an offset is $b_1$. In an initial relational expression corresponding to female, a gradient is $a_2$, and an offset is $b_2$.

In addition, a relational expression corresponding to the status "AFTER DATA SETTING OF USER" is a relational expression after correction. The processing unit 101 corrects the initial relational expression based on the set of the input body height, the actual traveling pitch, and the actual traveling speed of the user. Hereinafter, a method of correcting a relational expression according to the embodiment will be described with reference to FIG. 4. In FIG. 4, a dotted line 301 represents the initial relational expression. In addition, in FIG. 4, a solid line 302 represents the relational expression after correction. The processing unit 101 changes the offset of the initial relational expression 301 so as to pass through the set (actual traveling pitch, actual traveling speed) 303 of the actual traveling pitch and the actual traveling speed. At this time, the processing unit 101 does not change the gradient of the initial relational expression 301. For example, in an example illustrated in FIG. 10, the processing unit 101 corrects the relational expression by changing the offset of the initial relational expression corresponding to male from $d_1$ to a user coefficient $d_{s1}$. In addition, the processing unit 101 corrects the relational expression by changing the offset of the initial relational expression corresponding to female from $d_2$ to a user coefficient $d_{s2}$. The relational expression after correction stored in the storing unit 103 can be changed by a manual input from the input switch 107.

The set of the actual traveling pitch and the actual traveling speed of the user can be measured by the user actually traveling a predetermined distance d. The predetermined distance d is set in the wristwatch 100 in advance. The value of the predetermined distance d set in the wristwatch 100 can be changed by the user through the input switch 107 or the like. For example, the user may input a running distance or a walking distance after running or walking. The processing unit 101 measures the traveling time where the user travels the predetermined distance d. The processing unit 101 calculates the actual traveling speed by dividing the predetermined distance d by the traveling time. In addition, the traveling detection unit 105 calculates the actual traveling pitch by measuring the number of steps when the user travels the predetermined distance d, and dividing the measured number of steps by the traveling time.

Alternatively, the user may measure the actual traveling pitch and the actual traveling quickness using a method and then may input the actual traveling pitch and the actual traveling quickness through the input switch 107 and data transmission. As a result, when the relational expression is corrected or generated, it is not necessary that the user actually travel.

Figure 11:
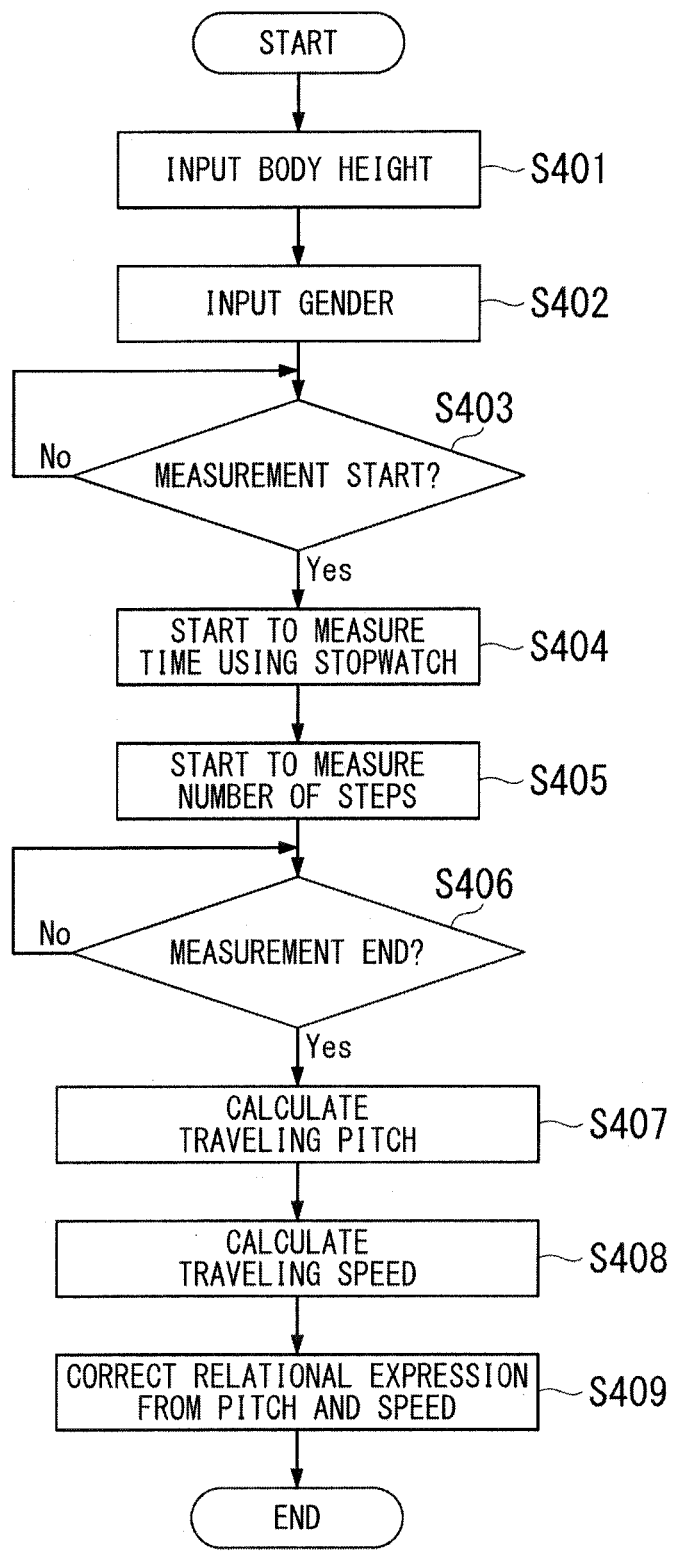
FIG. 11 is a flowchart illustrating the procedure of a relational expression correcting process which is executed by a wristwatch according to the third embodiment of the present invention.

Next, a relational expression correcting process in which the wristwatch 100 according to the embodiment corrects the relational expression will be described. FIG. 11 is a flowchart illustrating the procedure of the relational expression correcting process which is executed by the wristwatch 100 according to the embodiment. The wristwatch 100 executes the relational expression correcting process during the setup mode. During the setup mode, the user inputs an instruction to start the measurement and starts traveling. Next, once the user travels the predetermined distance d, the user inputs an instruction to end the measurement.

(Step S401) The processing unit 101 displays a body height input screen on the display unit 102 and receives an input of the body height. The user inputs the body height through the input switch 107. Next, the process proceeds to Step S402.

The processes of Step S402 to Step S408 are the same as those of Step S101 to Step S107 in the first embodiment.

(Step S409) The processing unit 101 corrects the relational expression from the body height, whose input is received in the process of Step S401, and the set of the traveling pitch calculated in Step S407 and the traveling speed calculated in Step S408. Specifically, first, the processing unit 101 reads the initial relational expression corresponding to the gender input in Step S402 from the storing unit 103. The processing unit 101 changes the offset of the read relational expression and corrects the relational expression so as to pass through the set of the calculated traveling pitch and the calculated traveling speed. The processing unit 101 writes the corrected relational expression into the storing unit 103 as the relational expression after correction Next, the relational expression correcting process ends.

Figure 12:
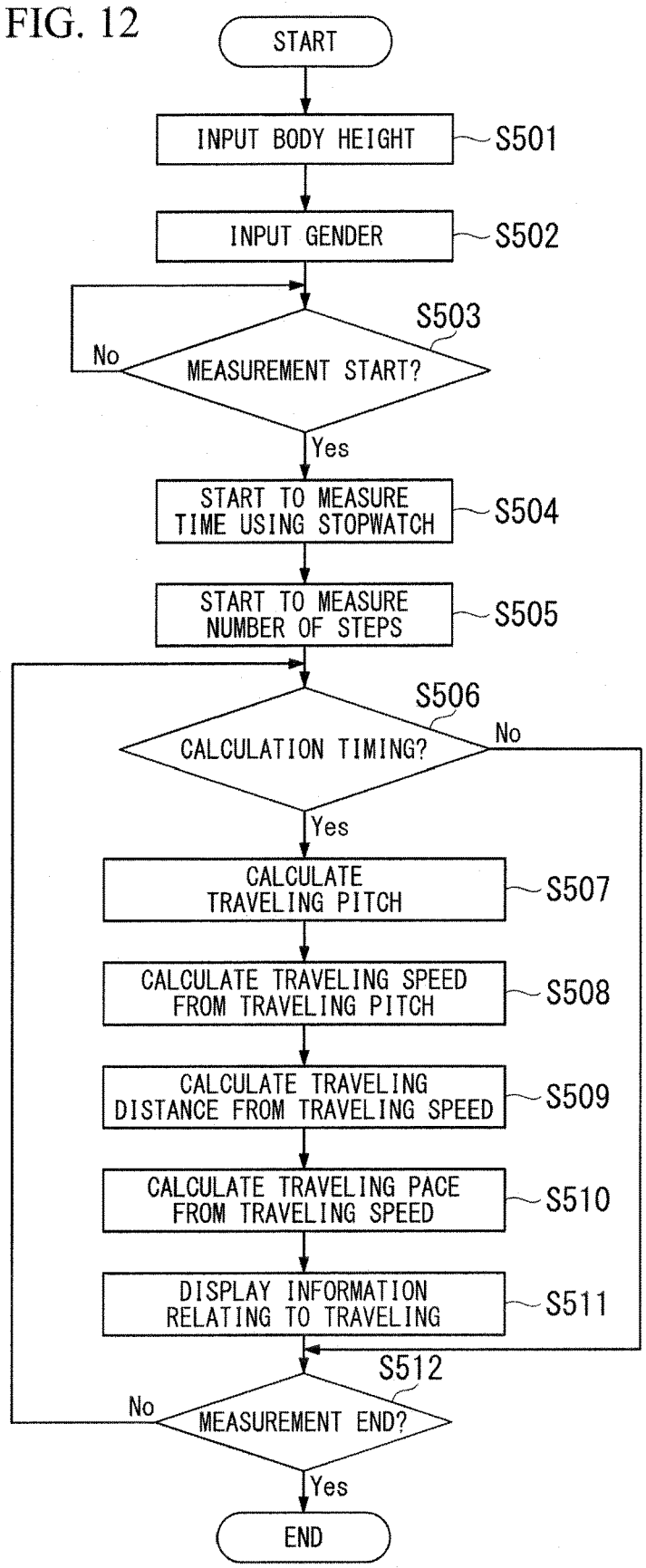
FIG. 12 is a flowchart illustrating the procedure of a speed calculating process which is executed by the wristwatch according to the third embodiment of the present invention.

Next, a speed calculating process in which the wristwatch 100 according to the embodiment calculates the traveling speed from the traveling pitch will be described. FIG. 12 is a flowchart illustrating the procedure of a speed calculating process which is executed by the wristwatch 100 according to the embodiment. The wristwatch 100 executes the speed calculating process during the measurement mode.

(Step S501) The processing unit 101 displays a body height input screen on the display unit 102 and receives an input of the body height. The user inputs the body height through the input switch 107. Next, the process proceeds to Step S502.

The processes of Step S502 to Step S507 are the same as those of Step S201 to Step S206 in the first embodiment.

(Step S508) The processing unit 101 calculates the traveling speed from the traveling pitch calculated in Step S507. Specifically, the processing unit 101 reads the relational expression after correction from the storing unit 103. Next, the processing unit 101 substitutes the body height, which is input in the process of Step S501, and the traveling pitch, which is calculated in the process of Step S507, into the read relational expression to calculate the traveling speed. When the relational expression after correction is not stored in the storing unit 103, the processing unit 101 calculates the traveling speed from the input body height and the calculated traveling pitch using the initial relational expression corresponding to the gender input in Step S101. Next, the process proceeds to Step S509.

The processes of Step S509 to Step S512 are the same as those of Step S208 to Step S211 in the first embodiment.

As described above, in the embodiment, the storing unit 103 stores the relational data indicating the relationship between the body height or the information relating to the body height, the traveling pitch, and the traveling speed in advance. The processing unit 101 calculates the traveling speed from the traveling pitch, which is measured by the traveling detection unit 105, based on the relational data stored in the storing unit 103. As a result, the traveling speed can be directly calculated from the measured traveling pitch without using a step length which is a fixed value. Therefore, the process highly corresponding to the running status (or walking status) can be performed, and the traveling speed can be calculated with few errors.

In addition, in the embodiment, the processing unit 101 corrects the relational expression, which is stored in the storing unit 103, based on the set of the input body height or the input information relating to the body height, the set of the actual traveling pitch and the actual traveling speed. As a result, a relationship between the traveling pitch and the traveling speed which is suited to the body height or the physical constitution of the user is set, and the traveling speed is calculated from the traveling pitch based on the set relationship. Therefore, a change in step length caused by a variation in traveling pitch is absorbed, and the traveling speed can be calculated with higher accuracy. As a result, the traveling distance and the traveling pace can also be calculated with higher accuracy.

A part or all of the functions of the respective units included in the wristwatches 100 according to the first embodiment to the third embodiment described above may be realized by recording a program for realizing these functions on a computer-readable recording medium and causing a computer system to read and execute this program recorded on the recording medium. The "computer system" described herein includes OS and hardware such as peripheral devices.

In addition, typically, the "computer-readable recording medium" includes portable mediums such as a flexible disc, a magneto-optic disc, a ROM, and a CD-ROM; and storages such as a hard disc built into a computer system, but is not necessarily limited thereto. Further, instead of the "computer-readable recording medium", the following mediums may be used: mediums on which a program is dynamically stored for a short period of time, for example, a network such as the Internet or a communication line such as a telephone line through which a program is transmitted; and mediums on which a program is stored for a predetermined amount of time, for example, a volatile memory which is built into a computer system functioning as a server or a client. In addition, the program may realize a part of the above-described functions or may realize the above-described functions in combination with a program stored in a computer system in advance.

Hereinabove, the plural embodiments of the present invention have been described. However, the present invention is not limited to the above-described plural embodiments, and various modifications can be added within a range not departing from the scope of the present invention.

For example, in the above-described embodiments, the relational expression indicating the relationship between the traveling pitch and the traveling speed is the primary expression, but the present invention is not limited thereto. For example, the relational expression indicating the relationship between the traveling pitch and the traveling speed may be a quadratic equation or a cubic expression.

In addition, in the above-described embodiments, the storing unit 103 stores the relational expression indicating the relationship between the traveling pitch and the traveling speed, but the present invention is not limited thereto. For example, as the relational data, the storing unit 103 may store table data indicating the relationship between the traveling pitch and the traveling speed.

In addition, in the above-described embodiments, the traveling detection unit 105 calculates the traveling pitch based on the traveling time and the measured number of steps, but the present invention is not limited thereto. The traveling pitch may be obtained using information relating to landing (information relating to a running (or walking) signal) based on the acceleration detected by the acceleration sensor 106. For example, the traveling detection unit 105 may calculate the traveling pitch by measuring an interval (time interval) between steps.

In addition, in the above-described embodiments, the processing unit 101 calculates the traveling speed from the measured traveling pitch, but the present invention is not limited thereto. The processing unit 101 may calculate the traveling pace from the traveling pitch instead of the traveling speed.

In addition, in the above-described embodiments, the wristwatch 100 has been described as an example of the electronic apparatus. However, other electronic apparatuses such as a pedometer, a mobile phone, and a smart phone may be used as long as the user can carry them.

INDUSTRIAL APPLICABILITY

The electronic apparatus according to the present invention is applicable to a mobile electronic apparatus to which an acceleration sensor and the like are mounted to calculate a running speed or a walking speed of a user.

REFERENCE SYMBOL LIST

100 WRISTWATCH
101 PROCESSING UNIT
102 DISPLAY UNIT
103 STORING UNIT
104 POWER SUPPLY
105 TRAVELING DETECTION UNIT
106 ACCELERATION SENSOR
107 INPUT SWITCH
108 IVIDER UNIT
109 QUARTZ OSCILLATOR UNIT

The invention claimed is:

1. An electronic apparatus comprising:
a mobile body of a wristwatch, a pedometer, a mobile phone or a smart phone;
an acceleration sensor provided on the mobile body;
a timer provided on the mobile body;
a memory storing relational data for each of predetermined user classifications, the relational data indicating a relationship between a traveling pitch, which is the number of steps taken per predetermined amount of time, and a traveling speed which is a running speed or a walking speed; and
one or more processors, in communication with the acceleration sensor, the timer and the memory, configured to:
acquire an actual set of traveling pitch and traveling speed related to a user based on an actual action of the user;
correct the relational data, which is stored in the memory, based on the actual set of traveling pitch and traveling speed;
measure a traveling pitch of the user based on acceleration parameters from the acceleration sensor; and
calculate a traveling speed of the user based on the measured traveling pitch of the user and on the relational data that correspond to a user classification input by the user and that has been corrected, without using a fixed step length value of the user.

2. The electronic apparatus according to claim 1,
wherein the one or more processors are configured to receive an input of a body height of the user or information relating to the body height of the user,
the memory stores the relational data indicating a relationship between a body height or information relating to the body height, a traveling pitch which is the number of steps taken per predetermined amount of time, and a traveling speed which is a running speed or a walking speed, and
the one or more processors are configured to calculate the traveling speed of the user based on the body height or the information relating to the body height and on the measured traveling pitch of the user based on the relational data stored in the memory.

3. The electronic apparatus according to claim 1, wherein the one or more processors are configured to:
acquire a plurality of sets of a measured traveling pitch and a traveling speed measured during measurement of the traveling pitch; and
generate the relational data indicating the relationship between the traveling pitch and the traveling speed based on the acquired plurality of sets of the traveling pitch and the traveling speed.

4. The electronic apparatus according to claim 1,
wherein the one or more processors are configured to receive an input of a set of a traveling pitch and a running quickness or a walking quickness.

5. The electronic apparatus according to claim 1,
wherein the one or more processors are configured to calculate a traveling distance, which is a running distance or a walking distance of the user, based on the calculated traveling speed.

6. The electronic apparatus according to claim 1,
wherein the one or more processors are configured to calculate a traveling pace, which is a walking pace or a running pace of the user, based on the calculated traveling speed.

7. The electronic apparatus according to claim 1,
wherein the memory stores table data indicating a relationship between the traveling pitch and the traveling speed.

8. The electronic apparatus according to claim 1,
wherein the one or more processors are configured to calculate a traveling pace, which is a running pace or a walking pace of the user, instead of the traveling speed of the user.

9. The electronic apparatus according to claim 1, wherein the user classifications include gender of the user.

10. The electronic apparatus according to claim 1, wherein the user classifications include body height or information relating to body height of the user.

11. A non-transitory computer readable medium storing a program causing a computer to execute:
a step of acquiring an actual set of traveling pitch and a traveling speed measured during measurement of the traveling pitch based on an actual action of a user;
a step of correcting relational data indicating a relationship between a traveling pitch, which is the number of steps taken per predetermined amount of time, and a traveling speed, which is a running speed or a walking speed, based on the acquired actual set of the traveling pitch and the traveling speed;
a step of measuring a traveling pitch of the user based on acceleration parameters from an acceleration sensor; and
a step of calculating a traveling speed of the user based on the measured traveling pitch of the user and on relational data that correspond to a user classification input by the user and that has been corrected, without using a fixed step length value of the user.

* * * * *